US005821551A

United States Patent [19]

Roh

[11] Patent Number: 5,821,551

[45] Date of Patent: Oct. 13, 1998

[54] PAPER SENSING APPARATUS FOR SENSING PAPER FEEDING FROM PAPER CASSETTE AND PAPER PRESENCE FOR PRINTING OPERATION IN A LASER BEAM PRINTER

[75] Inventor: Seuk-Pil Roh, Kyungki-do, Rep. of Korea

[73] Assignee: SamSung Electronics Co., Ltd., Kyungki-do, Rep. of Korea

[21] Appl. No.: 794,732

[22] Filed: Feb. 3, 1997

[30] Foreign Application Priority Data

Feb. 3, 1996 [KR] Rep. of Korea ........................ 96-1652

[51] Int. Cl.[6] ...................................................... G01N 21/86

[52] U.S. Cl. ........................ 250/559.4; 250/216; 355/121

[58] Field of Search ................................ 250/559.4, 216, 250/221, 227.21, 227.22, 551, 239; 257/81–84, 433–436; 355/121; 362/16; 399/371, 372, 386–388, 396

[56] References Cited

U.S. PATENT DOCUMENTS

| | | | |
|---|---|---|---|
| 3,682,543 | 8/1972 | Iwamoto | 355/13 |
| 4,713,550 | 12/1987 | Anzai et al. | 250/559.24 |
| 5,065,146 | 11/1991 | Garret | 250/221 |
| 5,181,073 | 1/1993 | Araki | 355/243 |
| 5,371,353 | 12/1994 | Shibuya | 250/208.3 |
| 5,406,354 | 4/1995 | Taki et al. | 355/207 |
| 5,453,825 | 9/1995 | Lipiz | 250/559.29 |
| 5,477,223 | 12/1995 | Destremps | 250/221 |
| 5,515,088 | 5/1996 | Carpentier et al. | 346/102 |
| 5,519,483 | 5/1996 | Kawanishi et al. | 355/311 |

*Primary Examiner*—Que Le
*Attorney, Agent, or Firm*—Robert E. Bushnell, Esq.

[57] ABSTRACT

A paper sensor apparatus of a laser beam printer includes a LED located on the center of a substrate, obliquely positioned two-facet mirror for reflecting the light from the LED to both sides of the LED, photodiodes for receiving the light, and a paper presence detecting shutter and a paper feeding shutter located between the photodiodes and the obliquely positioned two-facet mirror, respectively for blocking or transmitting the light. Low production cost and an enhancement of productivity can be achieved because the structure of the paper presence detecting sensor and paper feeding sensor can be made cheaply and automatic assembly is possible.

20 Claims, 1 Drawing Sheet

PAPER SENSING APPARATUS FOR SENSING PAPER FEEDING FROM PAPER CASSETTE AND PAPER PRESENCE FOR PRINTING OPERATION IN A LASER BEAM PRINTER

CLAIM OF PRIORITY

This application makes claims all benefits accruing under 35 U.S.C. §119 from an application for PAPER SENSOR APPARATUS OF LASER BEAM PRINTER earlier filed in the Korean Industrial Property Office on 3 Feb. 1996 and there duly assigned Ser. No. 1652/1996.

BACKGROUND OF THE INVENTION

1. Field of the Invention

The present invention relates to a paper sensor apparatus of a laser beam printer for sensing the presence of paper and the conveyance of paper, and more particularly, to a paper sensor apparatus of a laser beam printer providing an automated sensor with low installation and production costs.

2. Discussion of Related Art

The use of photoemitters and photodetectors to detect the presence and conveyance of paper in an image forming apparatus is not novel. For example, U.S. Pat. No. 5,519,483 for a Detection System And Detection Method Of Document Size For Use In A Document Reader to Kawanishi, et al, discloses a detection system that detects the presence and the size of a document in a document feed system. A light emitting element reflects off the original document and the reflected light is received by a photo receptor.

U.S. Pat. No. 4,713,550 for a Document Size Detection Apparatus to Anzai et al. discloses a document size detection apparatus used to detect the size and the presence of a document in a photocopying system. A photo emitter emits the light which reflected off the cover and back into a photo detector. When an original is placed on a photocopying machine, the original interrupts some of the beams of the light, thus signaling to the machine that an original is present on the photocopying machine.

U.S. Pat. No. 3,682,543 for a Device For Detecting The End Of A Roll Of Copy Paper In A Photocopying Machine Or The Like to Iwamoto discloses a device for detecting the end of a roll of a copy paper in a photocopying machine or the like. A photo emitter and a photo detector are used in this invention. Light from the photo emitter reflects off the paper and it is captured by the photo detector. When the roll of the paper is finished, the light from the photo emitter reflects off the spool, thus resulting in a different intensity signal to be received by the photo detector. However, the paper itself does not trigger a separate shutter to interrupt a beam of light.

Finally, U.S. Pat. No. 5,371,353 for an Object Detecting Device Having Multiple Optical Sensors With A Common Output Line And A Common Selection Signal Line to Shibuya discloses an image forming apparatus such as a facsimile machine, copy machine or the like that uses photo emitters and photo detectors to detect the conveyance of a sheet of paper. In Shibuya '353, the sheet of paper interrupts the beam of light thus signaling the controller the presence of conveyance of a sheet of paper.

What is needed is a detection device that actuates one or more shutters, each capable of interrupting a beam of light preventing the beam of light from reaching a photodetector. Thus, only one LED is required to detect a multitude of attributes in an image forming apparatus. Also, the paper or the recording medium itself is not itself optically illuminated by a beam of light in the sensing and detecting process. The result is a more reliable and easy to manufacture paper detection system using photodetectors and photoemitters.

SUMMARY OF THE INVENTION

Accordingly, it is an object to provide a paper sensor apparatus of a laser beam printer providing a function of paper sensoring and a low production cost.

It is also an object to provide a single apparatus that detects the presence and the conveyance of paper by having an shutter move into and interrupt the path of a beam of light, and detecting the interruption via a photodetector.

It is yet another object to measure and detect two attributes in an image forming apparatus using only one LED.

It is still another object to detect the presence and the movement of a sheet of recording medium in an image forming apparatus without having to illuminate or directly shine a beam of light from onto the sheet of recording medium. Instead, the presence and the movement of the sheet of recording medium can be detected indirectly.

To achieve these and other advantages and in accordance with the purpose of the present invention, as embodied and broadly described, a paper sensor apparatus of a laser beam printer comprises a LED emitting a light. A two-facet mirror that divides the incident beam of light into two equally intense beams, and two photodiodes receiving the light from each beam, so that it can sense the presence of paper and the conveyance of paper. In addition, two shutters are used to interrupt respective ones of each of the two beams of light depending on whether the presence of paper is sensed or the conveyance of paper is sensed.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
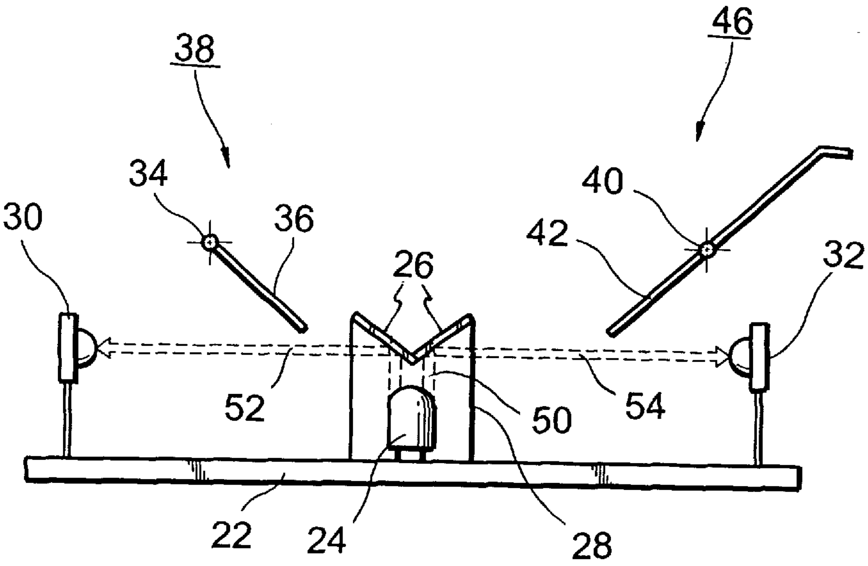
FIG. 1 is a front view of one embodiment of the present invention.
Figure 2:
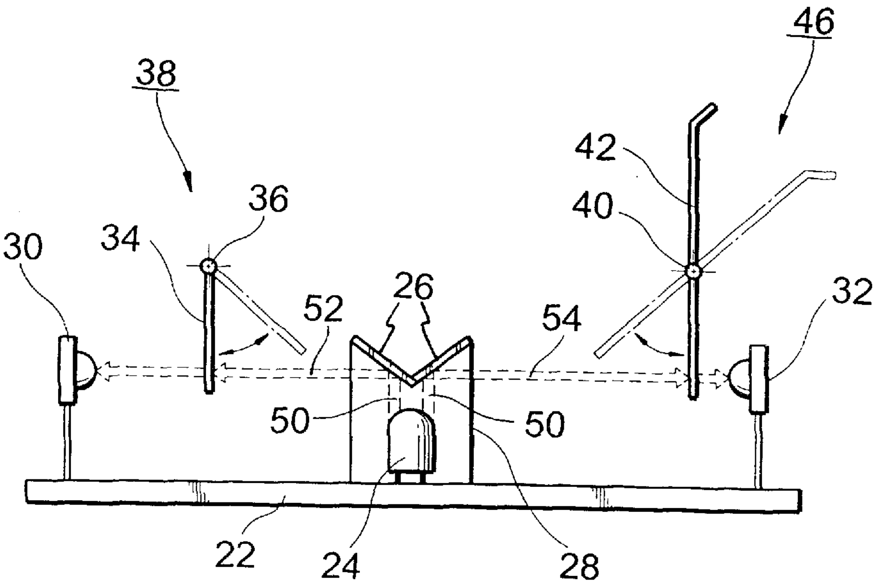
FIG. 2 is a front view showing the operation of the present invention.

Turning to FIGS. 1 and 2, a paper sensor apparatus of a laser beam printer includes a LED 24 located on the center of a substrate 22 emitting beam 50 onto an obliquely positioned two-facet mirror 26 mounted above the LED for reflecting beam 50 to at right angles to and at both sides of the LED 24. The obliquely positioned two facet mirror 26 divides beam 50 into two equal beams 52 and 54, traveling away from each other and at right angles to and away from beam 50. The obliquely positioned two-facet mirror 26 is installed by a support 28 made of transparent acrylic material.

Photodiodes 30 and 32 are provided at both sides of the LED 24 in order to receive the light from beams 52 and 54 respectively. A paper presence detecting shutter 38 is located between the mirror 26 and the paper presence detecting photodiode 30. Paper presence detecting shutter 38 is actuated so as to allow beam 52 to reach photodiode 30 only when a sheet of paper is present. Paper presence detecting shutter 38 is actuated so as to interrupt beam 52 preventing beam 52 from reaching photodetector 30 when no sheet of paper is present. Meanwhile, paper feeding shutter 46 is located between mirror 26 and the paper feeding photodiode 32. Paper feeding shutter 46 is actuated so as to allow beam 54 to reach photodiode 32 when a sheet of paper is being conveyed. When a sheet of paper is not being conveyed, shutter 46 is actuated so as to interrupt beam 54, preventing beam 54 from reaching photodiode 32.

The shutters 38 and 46 rotate with their central axes 34 and 40, respectively, so that the shutters' blocking sides 36 and 42 respectively can block or allow transmission of beams 52 and 54 respectively from reaching photodiodes 30 and 32, respectively.

The following description relates to the operation of the present apparatus, referring to FIG. 2. The photodiodes 30 and 32 receive the light beams 52 and 54 respectively reflected from the LED 24 by the obliquely positioned two-facet mirror 26. If paper is present, the paper presence detecting shutter 38 ascends, so that the photodiode 30 receives the transmitted light and becomes turned on. On the contrary, if paper is absent, a paper presence detecting shutter 38 descends, so that the light which will be transmitted to the photodiode 30 is blocked and consequently the photodiode 30 is turned off.

In case of a paper feeding sensor, while the paper feeding shutter 46 ascends, the photodiode 32 becomes turned on because the light is transmitted. On the contrary, while the paper feeding shutter 46 descends, the photodiode 32 switches to off-mode because the light is blocked. The explanation of the structure and details of the paper presence detecting shutter 38 and the paper feeding shutter 46 are omitted in this invention because the shutters 38 and 46 are conventional arts.

Therefore, the present invention senses in accordance with the blocking and transmission of the light from the LED 24 by the paper presence detecting shutter 38 and the paper feeding shutter 46. When the photodiodes 30 and 32 are receiving light from beams 52 and 54 respectively, the sensor senses that paper exists and is conveyed. On the contrary, if the photodiodes 30 and 32 are switched off and not receiving light from beams 52 and 54 respectively, the sensor senses that paper does not exist and is not conveyed.

Because the operation of paper presence detecting and paper feeding sensing is completed in this invention, the low production cost can be achieved due to cheaper parts than a conventional photo sensor, the productivity can be enhanced due to the use of the parts to insert and disassemble by automatization and the inferior goods by the flux can be eliminated.

It will be apparent to those skilled in the art that various modifications and variations can be made in a paper sensor apparatus of a laser beam printer of the present invention without departing from the spirit or scope of the invention. Thus, it is intended that the present invention cover the modifications and variations of this invention provided they come within the scope of the appended claims and their equivalents.

What is claimed is:

1. A paper sensor apparatus of a laser beam printer, comprising:

a substrate positioned along a paper path of said laser beam printer;

a light source located at the center of said substrate for emitting a light beam;

reflectors for reflecting the light beam from said light source to both sides of said light source;

photodiodes each installed at opposite sides of said light source, for receiving the lightbeam reflected from said reflectors to determine the feeding of a paper from a paper cassette into said paper path and the presence of said paper at a predetermined position along said paper path for printing operation; and shutters each positioned at opposite sides of said light source, and rotatable to permit transmission of the light beam reflected from said reflectors to said photodiodes, when said paper is fed from said paper cassette into said paper path or when said paper is present at said predetermined position along said paper path for said printing operation.

2. The paper sensor apparatus of claim 1, further comprised of said shutters comprising;

a paper presence shutter installed between said reflectors and a first one of said photodiodes along said predetermined position to block the light beam reflected from said reflectors to said first one of said photodiodes, and activated in response to the presence of said paper at said predetermined position along said paper path for enabling transmission of the light beam reflected from said reflectors to said first one of said photodiodes; and a paper feeding shutter installed between said reflectors and a second one of said photodiodes to block the light beam reflected from said reflectors to said second one of said photodiodes, and activated in response to the feeding of said paper from said paper cassette into said paper path for enabling transmission of the light beam reflected from said reflectors to said second one of said photodiodes.

3. A paper detection device, comprising:

a light emitting diode emitting a first beam of light;

a two-facet mirror, each facet positioned obliquely with respect to said first beam, causing said first beam to divide equally into a second beam of light and a third beam of light, said second and said third beam of light traveling perpendicularly and away from said first beam of light;

a first photodetector for detecting said second beam of light;

a second photodetector for detecting said third beam of light;

a first shutter for blocking said second beam, said first shutter allowing said second beam to reach said first photodetector only upon sensing the presence of a sheet of paper; and a second shutter for blocking said third beam, said second shutter allowing said third beam to reach said second photodetector only upon sensing the conveyance of a sheet of paper.

4. The paper detection device of claim 3, said first shutter pivots about a first hinge between a first position and a second position depending on whether or not a sheet of paper is present.

5. The paper detection device of claim 4, said first shutter allowing said second beam of light to reach said first photosensor by rotating said shutter to said first position whenever said first shutter senses the presence of a sheet of paper.

6. The paper detection device of claim 5, said first shutter interrupting said second beam of light and preventing said second beam of light from reaching said first photosensor by rotating said first shutter to said second position whenever the absence of a sheet of paper is detected.

7. The paper detection device of claim 3, said second shutter pivots about a second hinge between a first position and a second position depending on whether or not a sheet of paper is being conveyed.

8. The paper detection device of claim 7, said second shutter allowing said third beam of light to reach said second photosensor by rotating said shutter to said first position whenever said second shutter senses the conveyance of a sheet of paper.

9. The paper detection device of claim 8, said second shutter interrupting said third beam of light and preventing said third beam of light from reaching said second photosensor by rotating said second shutter to said second position whenever the absence of a sheet of paper is detected.

10. The process of detecting the presence of a sheet of paper in an image reproduction machine, comprising triggering a shutter to move out of the path of a beam of light so as to allow a photosensor to detect said beam of light upon the detecting the presence of a sheet of paper.

11. The process of detecting the conveyance of a sheet of paper in an image reproduction system, comprising triggering a shutter to move out of the path of a beam of light so as to allow for the transmittance of said beam of light to a photosensor upon the detection of the conveyance of a sheet of paper.

12. A paper sensing system for sensing a paper along a paper path of an image forming apparatus, comprising:

a light source for emitting a light beam in opposite directions;

a first light receiver installed on one side of said light source, for receiving the light beam emitted from said light source to determine the feeding of a paper from a paper cassette into said paper path;

a first shutter installed between said light source and said first light receiver, and actuated to regulate transmission of the light beam emitted from said light source to said first light receiver when said paper is fed into said paper path;

a second light receiver installed on an opposite side of said light source, and at a predetermined location along said paper path, for receiving the light beam emitted from said light source to determine the presence of said paper at said predetermined location along said paper path for printing operation; and a second shutter installed between said light source and said second light receiver, and actuated to regulate the transmission of the light beam emitted from said light source to said second light receiver when said paper is present at said predetermined location along said paper path.

13. The paper sensing system of claim 12, further comprised of said light source comprising a light emitting diode for emitting said light beam, and a beam splitter for splitting said light beam in opposite directions toward said first light receiver and said second light receiver.

14. The paper sensing system of claim 12, further comprised of said first light receiver and said second light receiver each corresponding to a photodiode sensitive to said light source.

15. The paper sensing system of claim 12, wherein said first shutter is positioned to block the light beam emitted from said light source to said first light receiver, and operates to facilitate the transmission of the light beam emitted from said light source to said first light receiver when said paper is fed into said paper path.

16. The paper detection device of claim 15, wherein said second shutter is positioned to block the light beam emitted from said light source to said second light receiver, and operates to facilitate the transmission of the light beam emitted from said light source to said second light receiver when said paper is present at said predetermined location along said paper path.

17. The paper detection device of claim 16, further comprised of said light source comprising a light emitting diode for emitting said light beam, and a beam splitter for splitting said light beam in opposite directions toward said first light receiver and said second light receiver.

18. The paper detection device of claim 16, further comprised of said first light receiver and said second light receiver each corresponding to a photodiode sensitive to said light source.

19. The paper sensing system of claim 12, wherein said first shutter is activated, when said paper is fed from said paper cassette into said paper path, to unblock the light beam emitted from said light source to said first light receiver for determining that said paper has been fed from said paper path into said paper path.

20. The paper detection device of claim 19, wherein said second shutter is activated, when said paper is present at said predetermined location along said paper path, to unblock the light beam emitted from said light source to said second light receiver for determining that said paper is present at said predetermined location along said paper path.

* * * * *